(No Model.) 2 Sheets—Sheet 1.
T. F. GAFFNEY.
POWER DRIVING MECHANISM.
No. 500,484. Patented June 27, 1893.
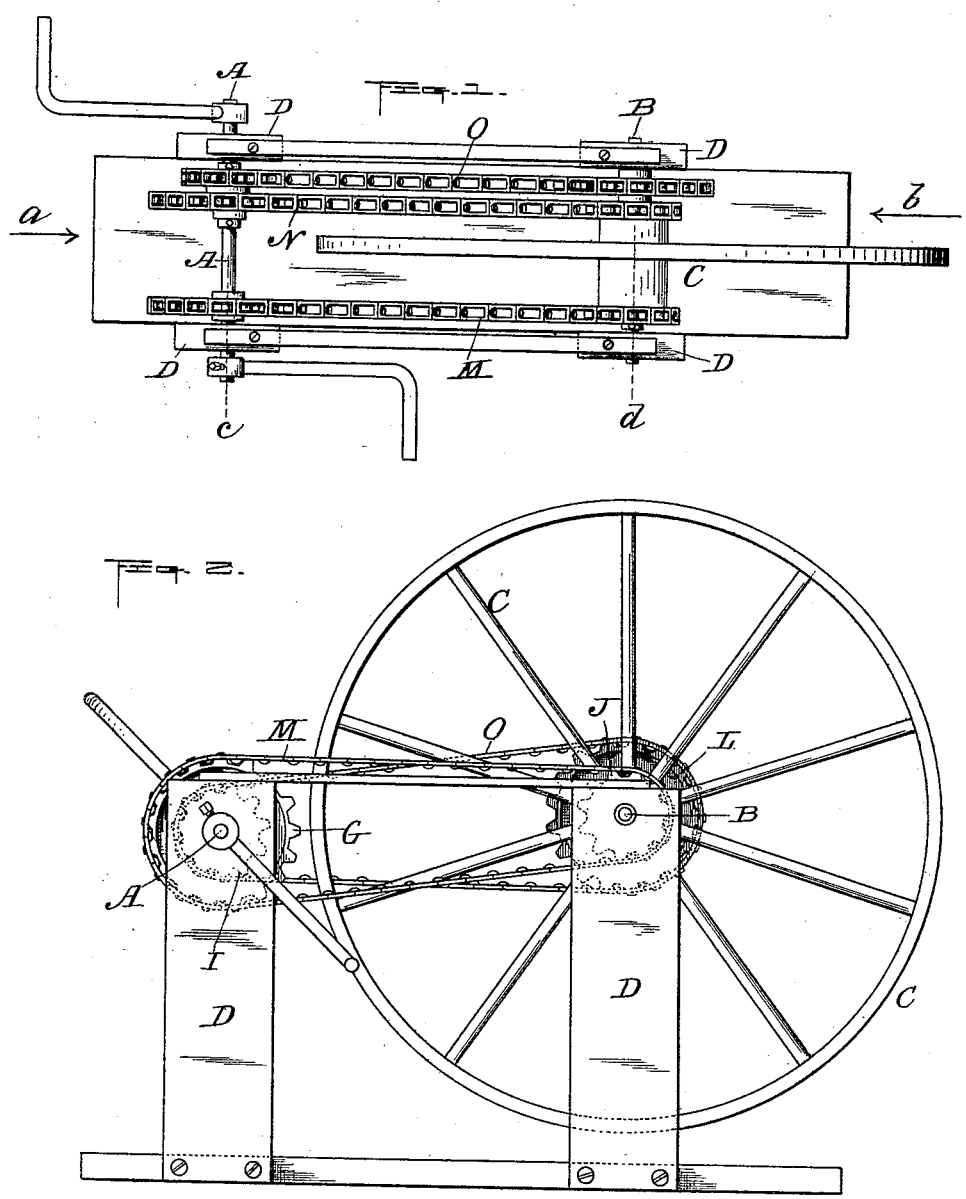
Witnesses,
W. B. Nourse.
C. Forrest Wesson.
Inventor,
Thomas F. Gaffney.
By A. A. Barker, Att'y.

(No Model.) 2 Sheets—Sheet 2.
T. F. GAFFNEY.
POWER DRIVING MECHANISM.
No. 500,484. Patented June 27, 1893.
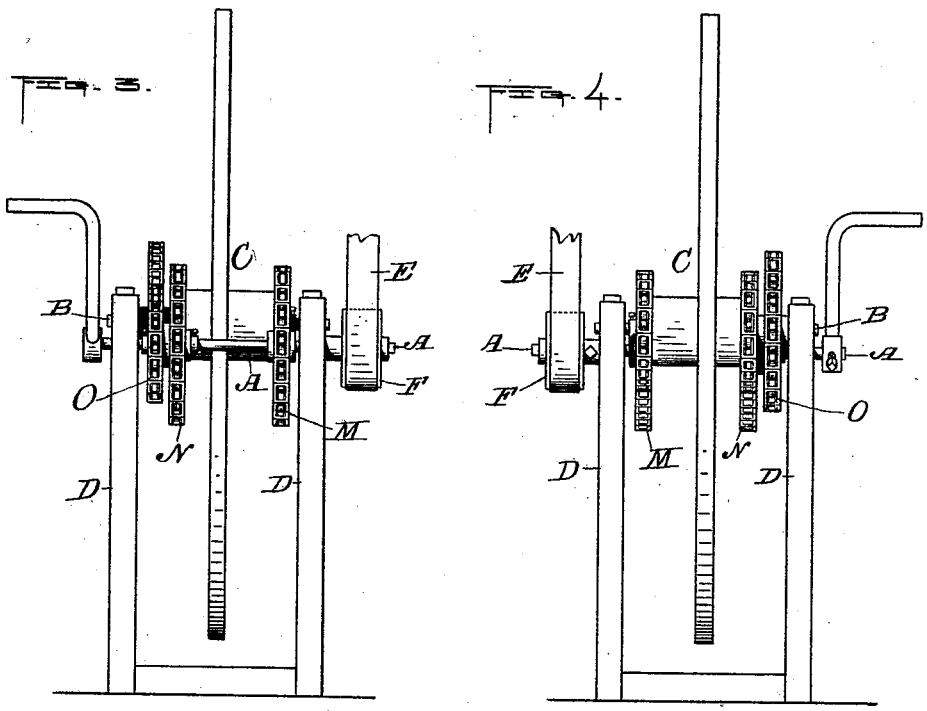
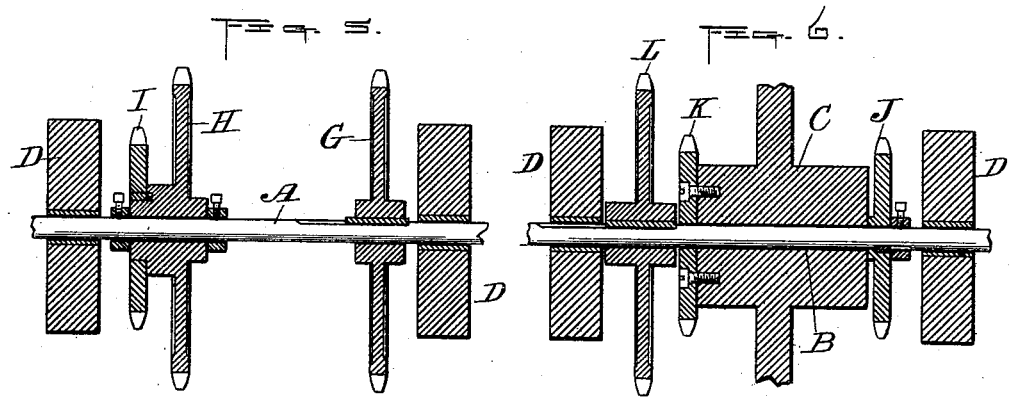

United States Patent Office.

THOMAS F. GAFFNEY, OF WORCESTER, MASSACHUSETTS, ASSIGNOR OF ONE-THIRD TO JOHN JOSEPH KENNEDY, OF SAME PLACE.

POWER DRIVING MECHANISM.

SPECIFICATION forming part of Letters Patent No. 500,484, dated June 27, 1893.

Application filed February 6, 1893. Serial No. 461,126. (No model.)

*To all whom it may concern:*

Be it known that I, THOMAS F. GAFFNEY, of the city and county of Worcester and State of Massachusetts, have invented certain new and useful Improvements in Power Driving Mechanism; and I do hereby declare that the following is a full, clear, and exact description thereof, reference being had to the accompanying drawings, forming a part of this specification, and in which—

Figure 1 represents a plan, and Fig. 2 a side view of a device illustrating my improved power driving mechanism. Figs. 3 and 4 are end views of the device, looking in the directions indicated by arrows $a$ and $b$ respectively; showing, also, a modification in the way of turning the drive shaft thereof, and Figs. 5 and 6 represent upon a larger scale, transverse sections through the device, taken on lines $c$ and $d$ respectively.

My invention is designed, mainly, for use on velocipedes, and more especially on bicycles, to increase the speed thereof; but it is also equally as applicable for other purposes where it is desired to drive a wheel, a fan, or similar part, at a higher rate of speed than the drive-shaft of the vehicle or device upon which it is employed.

Said invention consists of a series of sprocket-wheels mounted on a drive-shaft and connected by a series of endless chains with another series of sprocket-wheels on a shaft parallel to said drive-shaft, and upon which the wheel, fan, or other part to be driven, is mounted,—as will be hereinafter more fully set forth.

In order that others skilled in the art to which my invention appertains, may better understand the nature and purpose thereof, I will now proceed to describe it more in detail.

In the drawings: A represents the drive-shaft, B the wheel or fan-shaft and C a wheel mounted and fitted to turn on shaft B. Said shafts A and B are arranged parallel to each other and fitted to turn in suitable bearings D. The drive-shaft may be turned by hand or foot power, or by mechanical power communicated to said shaft through a belt E and pulley F, or in any other suitable manner, as occasion may require, according to the use to which the driving mechanism may be applied. Upon the drive-shaft A are mounted the sprocket-wheels G, H, and I, while upon the shaft B are mounted, in addition to the wheel C, the sprocket-wheels J, K, and L, corresponding in position to the wheels G, H, and I,— the wheel G being arranged in line with the wheel J, and connected by the endless chain M; the wheel H with the wheel K, and connected by the endless chain N, and the wheel I with the wheel L, and connected by the endless chain O.

G, H, and L are the driving wheels, and I, J, and K the driven wheels,—the driving wheels being considerably larger than those driven, as shown, so as to increase or multiply the speed, through the aforesaid endless chain connections, from one pair of wheels to those preceding the same.

The wheels G, J, and L, are secured to and turn with their respective shafts upon which they are mounted; the wheel K is secured to the hub of wheel C and both turn together, independent of shaft B, while the wheels H and I are secured together and also turn independent of the shaft A, as is fully shown by the enlarged sections, Figs. 5 and 6 of the drawings.

By the foregoing construction and arrangement, it is obvious that when the shaft A is turned, the power is communicated therefrom through the wheel G, chain M, and wheel J, to shaft B; thence through said shaft to wheel L; thence from said wheel L through chain O, to wheel I, which turns with wheel H on shaft A as aforesaid, and finally from said wheel H through chain N and wheel K to the wheel C, or other part corresponding therewith which it is desired shall be driven at the higher rate of speed.

Assuming that the driving wheels are twice as large as the ones driven, or in other words, are capable of turning the driven wheels two revolutions to one of said driving wheels, it will at once be seen that by the employment of three sets of connected wheels as herein shown and described the speed at which the wheel C may be driven is eight times greater than that of the shaft A from which it receives its driving power, and said speed may be thus obtained and maintained at but little, if any, additional expenditure of motive power over that required for driving said wheel C by the use of one chain and set of wheels, as ordinarily. It is also obvious that by increasing or diminishing the size of the wheels, the speed may be regulated to produce any speed within a reasonable limit, that is desired. As, for instance, by making the driving wheels of such a size that each revolution thereof will cause the driven wheels to be turned four times instead of two, as previously stated, the speed of the wheel C may be increased to sixty-four times that of the driver-shaft A.

With the driver and driven wheels of the proportionate size shown in the drawings I have demonstrated in actual practice that the wheel C is turned about five and one-half revolutions to one revolution of the drive-shaft A. It will at once be apparent that driving mechanism by which the speed of one part may be thus increased over another, is particularly applicable to bicycles and tricycles, for increasing the speed of their drive-wheels, as I am thereby enabled to treble their speed over those employing the old style of driving-mechanism, having only one set of sprocket-wheels and one drive-chain.

Although designed more especially for the latter use, as previously stated, my invention may be employed for turning a blower-fan, or any other part required to be driven at a high rate of speed, and, if desired, additional sets of sprocket-wheels and chains may be used without departing from the principle of said invention.

By arranging the sets of speeding-up sprocket wheels and their connecting drive-chains on opposite sides of the driven wheel C side-draft on the bearings of the said wheel will be avoided, as will be obvious, the power being thus applied to the two opposite sides of said wheel so that it will be more evenly balanced and will run smoother than it would if all of the sprocket-wheels and driving chains were on one side of said wheel.

It is obvious that the combined wheel C and sprocket-wheel K, and the combined sprocket-wheels H, and I, being arranged to turn on their supports might be arranged on suitable bearings independent of the shafts, and still effect the same result, and I therefore do not limit myself to supporting the same on the shafts.

What I claim as new, and desire to secure by Letters Patent, is—

1. Improved driving-mechanism comprising in combination the rotary shaft A, sprocket-wheel G, secured thereto; rotary shaft B arranged parallel to shaft A; sprocket-wheel J secured to said shaft B; endless chain M connecting said wheels G and J; sprocket-wheel L, also secured to shaft B; sprocket-wheel I secured to wheel H and both fitted to turn together on shaft A; endless chain O connecting wheels L and I; sprocket-wheel H; sprocket-wheel K secured to wheel C and both fitted to turn together on shaft B; endless chain N connecting wheels H and K and said wheel C, substantially as and for the purpose set forth.

2. The combination of the rotary driving shaft A, and the sprocket wheel G secured thereto, of the rotary shaft B arranged parallel to the said shaft A, the sprocket wheel J secured to the said shaft B, the endless drive-chain M connecting said wheels G and J, the sprocket wheel L also secured to the shaft B, the connected sprocket wheels H and I both fitted to turn together on the said shaft A, the endless drive chain O connecting the said wheels L and I, the driven wheels C, the sprocket wheel K secured to said wheel C, and both fitted to turn together on said shaft B, the endless drive chain N connecting the said sprocket wheels H and K, one of the said endless drive-chains being arranged on one side of the said driven wheel C and the other two drive chains being arranged on the other side thereof so that all of the side strain will not come on one side of the said wheel, substantially as and for the purposes set forth.

THOMAS F. GAFFNEY.

Witnesses:
A. A. BARKER,
W. B. NOURSE.